Feb. 19, 1924.
C. H. LOGUE
1,483,899
INTERMESHING GEAR AND PINION, AND ART OR METHOD OF GENERATING THE SAME
Filed Sept. 30, 1919    2 Sheets-Sheet 1
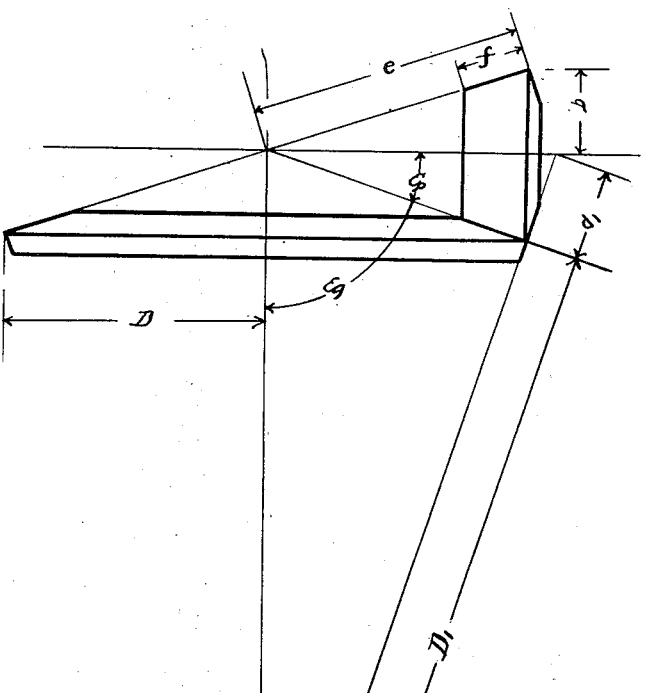
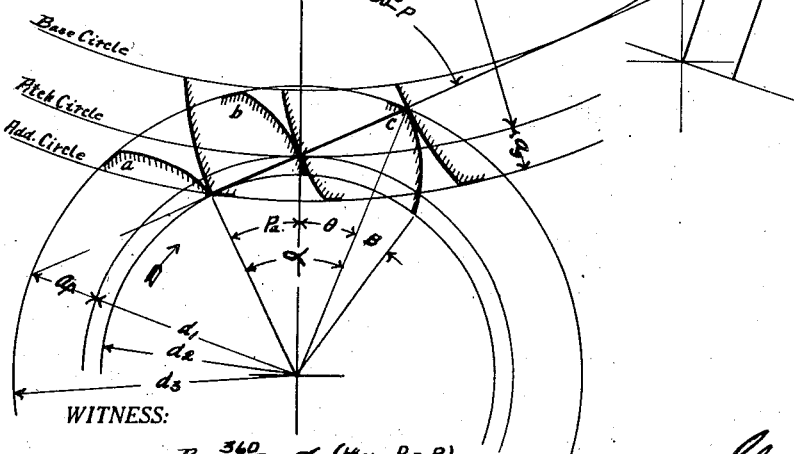

INVENTOR.
Charles H. Logue
BY
Parsons + Bodell.
ATTORNEYS.

Patented Feb. 19, 1924.

1,483,899

UNITED STATES PATENT OFFICE.

CHARLES H. LOGUE, OF SYRACUSE, NEW YORK, ASSIGNOR TO BROWN-LIPE-CHAPIN CO., OF SYRACUSE, NEW YORK, A CORPORATION OF NEW YORK.

INTERMESHING GEAR AND PINION, AND ART OR METHOD OF GENERATING THE SAME.

Application filed September 30, 1919. Serial No. 327,379.

*To all whom it may concern:*

Be it known that I, CHARLES H. LOGUE, a citizen of the United States, residing at Syracuse, in the county of Onondaga and State of New York, have invented a certain new and useful Intermeshing Gear and Pinion, and Art or Method of Generating the Same, of which the following is a specification.

This invention relates to the art of generating gear teeth and has for its object a method of generating or determining the tooth parts of gears or pairs of intermeshing gears and pinions in which the teeth are so constructed that they are the strongest possible for the pitch diameter used, and the invention consists in the method, and in the gears embodying the novel features and characteristics, all as hereinafter set forth and claimed.

In describing this invention, reference is had to the accompanying drawings in which like characters designate corresponding parts in all the views.

Figure 1 is a diagrammatic view of a gear and pinion lay out.

Figure 2 is a diagrammatic view illustrating the angles of action.

Figure 4:
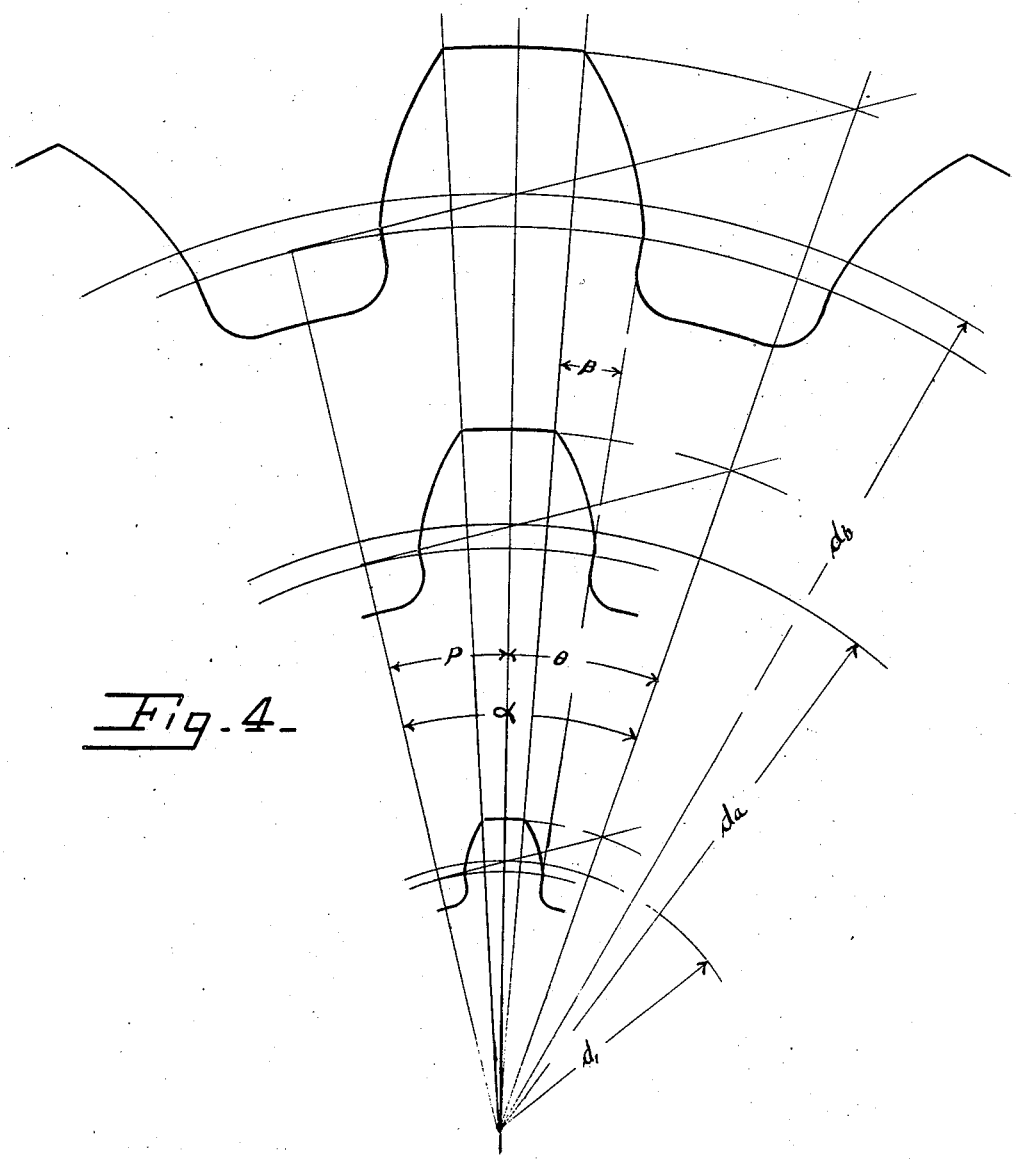
Figure 4 is a diagrammatic view showing that tooth dimensions vary directly as the pitch radius, for fixed values of gear ratio and number of teeth, increases.

This invention comprises a method of generating or determining the tooth parts of pairs of gears and pinions and the gears and pinions so produced in which the dimensions of the tooth parts are based upon the angles of approach and recess.

Heretofore, the usual procedure in designing gears has been to assume the pitch or the number of teeth then obtain gear and pinion tooth parts by means of certain proportionments based upon the desired pitch.

In gears embodying my invention the dimensions of the tooth parts are based upon the angles of approach and recess.

The number of teeth in theoretical contact is assumed and, then the number of teeth in the gear and pinion determined, so that instead of assuming the pitch or the number of teeth and studying the resultant action or judging the action from general or commonly accepted ideas as to the most desirable combination, I build up an action which is based on, or expressed in, terms of the angles of approach and recess.

The angles of approach and recess taken in any given case are those which experience and calculation have shown to be the most desirable for the given gear ratio and as they can be determined by those skilled in the art, it is thought unnecessary to set forth herein formulas by which they are determined, as those skilled in the art can readily derive the formulas. The number of teeth in theoretical contact is also that which experience and calculation have shown to be the most desirable for the gear ratio and conditions and as one skilled in the art can readily determine the proper number, it is thought unnecessary to set forth herein any formula for obtaining the number of teeth in theoretical contact. The number of teeth in the gear and the pinion are determined from the number of teeth in contact.

The angle of approach and the angle of recess are determined independently and have no direct connection with the angle of obliquity, the ratio of reduction (R) and the basic angle, being the basis for this calculation.

Having determined the angles of action, the corresponding tooth parts are found. The angle of approach is a function of the gear addendum and the angle of recess a function of the pinion addendum.

From the angles of approach and recess the corresponding gear and pinion addenda are found in accordance with the following formulas:—

$$d \sec E \sin p \frac{P_a}{p} = \text{gear addendum}.$$

$$\frac{d\left(\dfrac{\cos p}{\cos(p+\Omega)} - 1\right)}{\sec^2 E} = \text{pinion addendum}.$$

In both formulas:

Tan $p$ = tan of normal obliquity × secant spiral angle.

Cot E = $\sqrt{\text{ratio of reduction}}$ for spur gears.

Cot E = ratio of reduction for bevel gears.

Sine $P_a = \dfrac{\tan p}{\sec \Omega}$.

$d$ = pitch radius of spur or virtual radius of bevel pinion.

$P_a$ cannot exceed value of $p$.
$\Omega$ = basic angle (see explanation).

In the drawings, Fig. 1,
D = the pitch radius of the gear.
d = the pitch radius of the pinion.
D' = virtual pitch radius of the gear.
d' = virtual pitch radius of the pinion.
e = pitch cone distance.
f = face.
$E_g$ = pitch angle of gear.
$E_p$ = pitch angle of pinion.

In Fig. 2 the angles of action are illustrated—
$P_a$ = angle of approach.
$p$ = angle of obliquity.
$\alpha$ = virtual obliquity + angle of recess.
$\theta$ = angle of recess.
$A_p$ = pinion addendum.
B = the side angle.

In Fig. 4, the letters $a$, $b$, $c$ designate respectively the position of the pinion tooth at beginning of action, the position at the end of the angle of approach, and the pinion tooth at the end of its action.
$\varphi$ = angle of cutter or cutter obliquity.
$\Delta$ = spiral angle.
P = virtual obliquity.
$P_a$ = angle of approach.
$\theta$ = angle of recess.
B = see diagram Fig. 4, side angle.
$\alpha$ = virtual obliquity + recess angle.
$E_p$ = pitch angle of pinion.
$r$ = ratio $\dfrac{d'}{A_p}$.
$d'$ = virtual pitch radius.
$d$ = pitch radius.
$A_p$ = pinion addendum.
$A_g$ = gear addendum.
$N_c$ = teeth in contact.
$n$ = number of teeth in pinion
$n'$ = virtual number of teeth in pinion.

$\text{Sec}^2 E_p = 1 + \dfrac{1}{\text{ratio } 2}$.

$\Omega$ = basic angle.

The basic angle ($\Omega$) upon which comparative action is based, is assumed, the general idea being that the percentage of rolling action during each contact is decreased directly with this angle.

This basic angle may be anything, for example, 21°—31′, 20°—0′, 18°—0′.

In the design of bevel gears the following formulas are used.

Virtual obliquity $\tan P = \tan \phi \sec \Delta$

Ratio of virtual pitch radius to pinion addendum $$r = \dfrac{\sec^2 E_p}{\left(\dfrac{\cos P}{\cos (P+\Omega)}\right) - 1}$$

Pinion addendum $$A_p = \dfrac{d \sec E_p}{r} \text{ or } \dfrac{d}{r}.$$

Angle of recess $$\theta = \alpha - P \text{ in which } \cos \alpha = \dfrac{\cos P}{1 + \dfrac{1}{r}}$$

Angle of approach $$\text{sine } P_a = \dfrac{\tan \Omega}{\sec E_p}.$$

If $P_a$ exceeds $p$ make $P_a = P$.

Gear addendum when $P_a = PA_g = \sec^2 E_p d$ sine$^2$ $p$ or $\sec E_p d$, sine$^2$ $p$.

Gear add. when $P_a$ is less than P.

$$A_g = \left(\sec^2 E_p d \text{ sine } p \dfrac{P_a}{p}\right) - (\sec E_p d \text{ sine } p \; 0.05)$$

Teeth in contact—assumed $$N_c = 1.4 \cos \Delta \begin{cases} 1.25 \cos \Delta \text{ minimum} \\ 1.50 \cos \Delta \text{ maximum} \end{cases}$$

Teeth in pinion when $P_a$ is less than P $$n = \dfrac{360 N_c \cos E_p}{\tan \alpha} \text{ or } N_c = \dfrac{\dfrac{P_a + \theta B}{360}}{n \sec E_p}$$

Teeth in pinion when $$P_a = Pn = \dfrac{6.2832 N_c \cos E_p}{\tan \alpha}$$

Teeth in contact when $$P_a = PN_c = \dfrac{\tan \alpha \; n}{6.2832 \cos E_p}$$

For spur and bevel gears the same formulas are used except that in designing spur gears $$\text{Sec}^2 E_p = 1 + \dfrac{1}{\text{ratio}}.$$

For bevel gear design $$\text{Sec}^2 E_p = 1 + \dfrac{1}{\text{ratio}} 2.$$

In Fig. 4 is shown how in gears constructed in accordance with my method, tooth dimensions vary directly as the pitch radius and the actions in all three gears there illustrated are based upon the same angles of approach and recess and that the tooth dimensions vary directly as the pitch radii $d'$, $d^a$, $d^b$.

Gears so designed will always result in the strongest possible tooth for the pitch diameters on which the design is based and aside from checking the strength and the matter of securing proportionate tooth thickness the pitch is found merely as a matter of curiosity.

In gears constructed in accordance with my invention the number of teeth are reduced to a minimum.

The pitch is made as coarse as possible; the face as narrow as possible, the proportioning of the tooth parts is not from the pitch. In fact, gears made in accordance with my invention are contrary to practically all the accepted theories upon which the subject of tooth proportion have heretofore been based.

In constructing and designing both straight and spiral tooth beveled gears we begin with assumed pitch diameters 2D and 2d. From these diameters we determine the virtual radii $D_1$ and $d_1$ and consider these radii as the pitch radii as for spur gears upon which the tooth action is developed.

All dimensions calculated upon these radii $D_1$ and $d_1$ are referred to as virtual parts, as the virtual number of teeth would be the number of teeth contained in the virtual diameters $2D_1$ and $2d_1$, on a basis of the virtual pitch. Virtual obliquity is therefore the real or acting obliquity of an action. Reference to basic values apply to the engagement of the pinion with the crown gear or rack.

With bevel gears such as used for automobile drive, there is little danger of encountering inefficient action by making the gear addendum too long. Therefore if full effective length is desired which results in an angle of approach equalling the angle of obliquity in accordance with formula 6 hereinafter given.

For the bevel gear in general, it will be necessary to guard against an undersirable sliding action of the angle of approach as well as upon the recess. This will be necessary only as the pitch angles approach 45°. When the effective length of the gear addendum is thus shortened, a corrected angle of approach ($P_a$) must be found before the number of teeth is determined. We must then also find the value of side angle B which is the angle between the point of tooth and base line. See Fig. 3. The following formula for angle B is derived from data in the May, 1918 issue of "Machinery" page 800 by Reginald Thautschold.

$$B = e - \delta$$

in which $$e = \frac{57.296x}{d_2}$$

$$\text{sine } \delta = \frac{x}{d_3}$$

$$x = \sqrt{d^2_3 - d^2_2}$$

The formula heretofore given for the gear and pinion addenda are derived as follows:—

DESIGN OF BEVEL GEARS.

Tooth parts.

Virtual obliquity $$\text{Tan } P = \tan \phi \text{ sec } \Delta \quad (1)$$

Ratio of virtual pitch radius to pinion addendum $$r = \frac{\sec^2 E_p}{\left(\frac{\cos P}{\cos (P+\Omega)}\right) - 1} \quad (2)$$

Pinion addendum $$A_p = \frac{d \sec E_p}{r} \text{ or } \frac{d_1}{r} \quad (3)$$

Angle of recess $$\theta = a - P \text{ in which } \cos a = \frac{\cos P}{1 + \frac{1}{r}} \quad (4)$$

Angle of approach $$\text{Sine } P_a = \frac{\tan \Omega}{\sec E_p} \quad (5)$$

If $P_a$ exceeds P, make $P_a = P$

Gear addendum when $P_a = P$, $$A_g = \sec^2 E_p d \text{ sine}^2 p, \text{ or sec } E_p d, \text{ sine}^2 p \quad (6)$$

Gear add. when $P_a$ is less than P, $$A_g = \left(\sec^2 E_p d \text{ sine}^2 P\frac{P_a}{P}\right) - (\sec E_p d \text{ sine}^2 P \; 0.05) \quad (7)$$

Teeth in contact—assumed $$N_c = 1.4 \cos \Delta \begin{cases} 1.25 \cos \Delta \text{ minimum} \\ 1.50 \cos \Delta \text{ maximum} \end{cases} \quad (8)$$

Teeth in pinion when $P_a$ is less than $P$, $$n = \frac{360 N_c \cos E_p}{P_a + \theta + B} \text{ or } N_c = \frac{P_a + \theta + B}{\left(\dfrac{360}{n \sec E_p}\right)} \quad (9)$$

Teeth in pinion when $P_a = P$ $$n = \frac{6.2832 \, N_c \cos E_p}{\tan \alpha} \quad (10)$$

Teeth in contact when $P_a = P$ $$N_c = \frac{\tan \alpha}{6.2832} \frac{n}{\cos} E_p \quad (11)$$

$\phi$ = angle of cutter.
$P$ = virtual obliquity.
$P_a$ = angle of approach.
$\theta$ = angle of recess.
$B$ = see diagram Fig. 3.
$\alpha$ = virtual obliquity and recess L.
$\Delta$ = spiral angle.
$E_p$ = pitch angle of pinion.
$r$ = ratio $\dfrac{d}{A_p}$.
$d_1$ = virtual pitch radius ($d \sec E_p$).
$d$ = pitch radius.
$A_p$ = pinion addendum.
$A_g$ = gear addendum.
$N_c$ = teeth in contact.
$n$ = number of teeth in pinion.
$n_1$ = virtual number of teeth in pinion ($n \sec E_p$).
$\sec E_p = 1 + \dfrac{1}{\text{ratio}^2}$.

Recommended values for angle $\Omega$—
$\Omega = 21°-33'$ when quietest possible operation is desired—case hardened gears.
$\Omega = 20°-0'$ represents more conservative design—case hardened gears.
$\Omega = 15°-0'$ recommended for general purposes—untreated materials.

As this angle ($\Omega$) is increased, theoretical wear increases and noise of operation is reduced. For case hardened gears however the higher angle ($21°-33'$) allows a greater depth of case—consequently harder wearing surfaces, which will more than overcome theoretical wear losses.

The basic angle ($\Omega$) might be defined as the maximum angle of recess ($\theta$) for an infinity $\infty$ ratio, that is, for a pinion engaged with a rack.

According to the formulas herein introduced, both the angles of approach and of recess are constant for a given gear ratio for each assumed basic angle ($\Omega$).

The angle ($21°-33'$) is recommended when the quietest possible operation is desired,— if necessary at a sacrifice of wearing qualities. An angle of $15°-0'$ is recommended for general purposes and for untreated materials but it will be found that the estimated loss due to increased sliding action through the use of the higher basic angle will be more than overcome by the ability to then employ a deeper case,—therefore a harder wearing surface as the pitch is increased, which is the result of the higher angle.

Lower values for the angle $\beta$ may be employed as desired, but $21°-33'$ expresses the high limit of good practice for case hardened steels, and $18°0'$ the high limit for untreated materials. The basic angle represents the angle of recess ($\theta$) for an infinity ratio, that is, for a pinion engaged in a rack.

The assumption as to normal obliquity ($\varphi$) (cutter angle) is a matter of judgment. In general the 20 degree is recommended. The $14\frac{1}{2}$ degree is not satisfactory for high duty and cannot compare, either as to strength or wearing quality, with the 20 degree.

In straight tooth gears the normal obliquity (cutter angle) and virtual obliquity are equal, that is, the obliquity of the cutter used in the acting obliquity of the gears.

For spiral gears, however, the virtual obliquity varies with the spiral angle, the normal obliquity being fixed. This relation is shown by formula 1 above.

The tooth action of spiral bevel gears is exactly that of the straight tooth bevel gear; that is, any one section may be considered as such. The normal obliquity need not be considered in laying out or calculating tooth parts for such gears. After the virtual obliquity is determined by means of formula 1, the normal obliquity is of no further interest.

Normal obliquity is here referred to as "cutter angle" to avoid confusion with the acting (virtual) obliquity.

To avoid interference, the pinion dedendum must either be sufficiently deep or sufficiently shallow. The gear addendum must either clear the flank of pinion tooth, that is, avoid all contact below base line, or be cut off so short that interference is impossible, as per the following formula:—

PINION DEDENDUM.

To avoid interference—

$$d_e = \frac{(1 - \cos \phi) + (\text{sine } \phi\, 0.35)}{\sec^2 E_p \text{ (or } \sec^2 E)} d_1$$

$d_e$ = Minimum pinion dedendum.
$d_1$ = Virtual pitch radius of pinion.
$E_p$ = Pitch angle of pinion.
$\varphi$ = Normal obliquity of action.

The pitch angle being 18°–0 or less the value (sec² $E_p$) may be taken as 1.0. This includes the general run of bevel drive gears. Pinion dedendum may be deeper, to accommodate gear addendum but it must be made no shallower unless the gear addendum is made so short that it does not overlap the base circle of the pinion on the line of centers.

In such cases the gear addendum equals $d_1 - (\cos \varphi \, d_1)$ and the corresponding pinion dedendum ($d_{e1}$) equals:

$$d_{e1} = [d_1 - (\cos \phi \, d_1)] + \text{bottom clearance.}$$

The dedendum of pinion is of extreme importance—it must either exceed the value $d_e$ or fall short of $d_{e1}$. Dimensions between these values will cause interference.

The value $d_{e1}$ is not practical for the general run of drive bevel gears as the resultant loss of action on the angle of approach will cause discontinuity of action unless the pinion addendum is made excessively long, causing maximum wear.

$$\text{Sec}^2 E_p = 1 + \frac{1}{\text{ratio}^2} \text{ for bevel gears.}$$

$$\text{Sec}^2 E = 1 + \frac{1}{\text{ratio}} \text{ for spur gears.}$$

In gears produced by a generating process, of which a rack or crown gear is the base, interference is entirely a matter of pinion dedendum.

Interference has no direct connection with either numbers of teeth or pitch; it is a question of pitch diameters and obliquity of action.

Formula 6 above gives the full effective length of gear addendum, that is, an addendum resulting from an angle of approach, equalling the angle of obliquity. This is the length to which the gear addendum must be restricted in order to avoid interference.

An excellent way to encounter interference is to make the gear addendum slightly shorter than this length when a rack or crown gear is to be engaged. Since the usual automobile drive gear has practically a crown gear formation, it is recommended, in order to avoid interference, in straight tooth gears especially, that we make the gear addendum somewhat longer than that found by formula 6. That is, instead of employing sine² P, we make this value 0.070 for 14½° and 0.120 for 20° obliquity.

After determining the angles of action $P_a$ and $\theta$ and thereby the addendum of gear and of pinion, the next step is to assume a theoretical number of teeth in contact which will assure continuous contact.

It has been found from practice that the most efficient value for this is in the neighborhood of 1.40 and that it should be held between 1.25 and 1.50.

For spiral bevel gears, or for helical spur gears, multiply these values by the cosine of the spiral or helix angle, that is $N_c = 1.40 \cos \Delta$.

The number of teeth in contact increases directly as the number of teeth only when the ratio of the virtual pitch radius to pinion addendum ($r$) remains constant, and as a result the number of teeth in contact, for any tooth proportion based upon the pitch, increases but slowly as compared with the increase in the number of teeth. Therefore noise of operation then increases as we increase the number of teeth, altho not quite in direct proportion and increases directly with the number of teeth when $N_c$ is assumed.

Based upon the number of teeth in contact ($N_c$) and the angles of action ($P_a$, $\theta$ and B) we now determine the number of teeth in pinion by formula 9 or when the angle of approach equals the obliquity by formula 10, without the necessity of calculating angle.

The number of teeth found will usually be a fractional number. The nearest integral value must be taken, keeping within the limits as expressed in formula 8 for the minimum and maximum number of teeth in contact. Check this by means of second part of formula 9 or when approach equals angle of virtual obliquity, by formula 11.

It may sometimes be necessary to make a slight readjustment of pitch diameters to agree with the ratio of the numbers of teeth thus determined.

The number of teeth in gear is of course the number of teeth in pinion times the ratio of reduction ($N = nR$).

The usual practice is to hold the spiral angle between 30° 0′ and 35° 0′. Angles below thirty resulting in a product little better than straight tooth gears and angles above thirty-five avoided on account of the resultant axial thrust.

It might be suggested that we increase the angle to 45° 0′ or even higher and build axle housings sufficiently sturdy to carry the additional thrust. This would allow the use of extremely low ratios and bring the spiral bevel into direct competition with the worm gear. Construction capable of carrying worm gearing will certainly properly support a spiral bevel set of extreme angle.

It might be well to note here that employing a 12″ cutter, as is standard practice in cutting spiral bevel gears, the nearer the sine of spiral angle equals $$\frac{\text{average p. c. distance}}{6},$$

the closer we approximate the true spiral. Then a spiral angle of 30° is best suited for a gear with an average pitch cone distance of 3″ and the proper spiral angle ($\Delta$) for a 5″ pitch cone distance is 56° 26′. It will be seen therefore that better gears may be produced by raising the spiral angle, as the average automobile drive gear has a pitch cone distance of 5.5".

Reference to Fig. 4 illustrates that for a given value of $r$ the strength of the pinion will vary directly as the average virtual pitch radius ($d$,) for a given virtual number of teeth.

In general, the points to keep in mind regarding bevel gear design are as follows:—

Reduce the number of teeth to a minimum.

Make the pitch as coarse as possible.

Make the face as narrow as is possible.

Proportion pinion dedendum to avoid interference.

Restrict the angle of action to avoid undue friction.

Avoid proportioning the tooth part from the pitch.

Avoid a long pinion addendum.

Avoid a short pinion dedendum.

Avoid a large number of teeth in pinion.

Avoid a fine pitch.

Avoid a long arc of recess.

Avoid a wide face.

Avoid a large number of teeth in theoretical contact.

In fact, go contrary to practically all of the accepted theories upon the subject of tooth proportion to produce quiet efficient gears.

The following example has been worked out in strict accordance with the foregoing specification in order to supply an explanation of the principles involved and to assist in their application.

We are usually supplied with the pitch radius of the gear and the ratio of reduction. In this example we have:

Pitch radius of gear, $D = 5.3''$
Ratio of reduction, $R = 7.0$

The pitch radius of pinion, $d = \frac{5.3}{7} = 0.7571''$.

Cutter obliquity.

The first step is to decide upon a cutter obliquity ($\Phi$). In general, 20 degrees is recommended but this assumption is limited only by the angle of the cutters available. In this example 20 degrees is used.

ANGLE OF SPIRAL.

The angle of spiral should not be less than 30 degrees and may be made as high as desired, within practical limits. Too high an angle, however, will force the number of teeth in theoretical contact below the desired minimum: on the other hand, increasing this angle increases the acting (virtual) obliquity, thereby lengthening the action and reduces the number of teeth to a minimum.

The minimum set for the number of teeth in contact is 1.4 and since this example will require a minimum number of teeth suppose we assume an angle, which according to formula 8, for number of teeth in contact, will approach this minimum.

According to formula 8, the desired number of teeth in contact, $$N_c = 1.40 \cos \Delta$$

and if we assume, say 1.05 as a basis for the spiral angle, we have:

$$\cos \Delta = \frac{1.05}{1.40} = 0.7500:$$

therefore, $\Delta = 41° 24''$. Let us assume, however, that in this particular example an angle not over $40° 0'$ is desired, on account of spiral thrust limitations.

Virtual obliquity.

The first calculation necessary is to find the virtual obliquity (P) by formula 1, we have:

$$\text{Tan } P = \tan \Phi = \sec \Delta = 0.3640 \times 1.3054 = 0.4750 = 25° 25'.$$

Basic angle.

We must now assume a basic angle ($\Omega$) upon which comparative action is based; the general idea being that the percentage of rolling action during each contact is decreased directly with this angle although this relation has not yet been definitely established. This angle may be made as desired, although certain recommendations are made as to the proper limits. For extreme ratios it is best to take the maximum recommendation, that is $21° 33'$. This is especially desirable in cases where the pinion diameter is small and the coarsest possible pitch is required. It will be found that a theoretical loss due to the use of our maximum recommendation is more than made up by our ability to then apply a deeper case to the tooth surface. This recommendation ($21° 33'$) should not be exceeded as extreme wear begins just beyond this point.

For general practice a basic angle of $20° 0'$ is recommended and for untreated materials $18° 0'$ is good practice. Our present example being rather extreme and the pinion diameter small, let $\Omega = 21° 33'$.

Angle of approach.

The angle of approach and angle of recess are determined independently and have no direct connection with the angle of obliquity: the ratio of reduction (R) and the basic angle ($\Omega$) being the basis of their calculation.

The angle of approach is found by formula 5, we have:

$$\text{Sine } P_a = \frac{\tan \Omega}{\sec E_p} = \frac{0.3949}{1.0102} = 0.3909, \text{ or } 23° 0'.$$

in which, $E_p = 8° 8'$, $\sec E_p = 1.0102$, $\tan \Omega = 0.3949$ angle of approach may be found direct by referring to Fig. 5.

Angle of recess.

The angle of recess is found by means of formula 2. In this formula the ratio of the pinion addendum to its virtual pitch radius is employed. While this ratio ($r$) will change with each obliquity, it will be found that the resultant angle of recess is constant for a given ratio of reduction and basic angle. The advantage in employing the ratio ($r$) being that the pinion addendum may then be found by a simple calculation, see formula 3.

For a determination of $r$ we have:

$$\sec^2 E_p = 1 + \frac{1}{R^2} = 1\frac{1}{49} = 1.0203.$$

$$\cos P = \cos 25° 25' = 0.9032.$$

$$\cos (P + \Omega) = \cos 46° 58 = 0.6824.$$

According to formula 2, $$r = \frac{\sec^2 P}{\left(\frac{\cos P}{\cos (P+\Omega)}\right) - 1} = \frac{1.0203}{\left(\frac{0.9032}{0.6824}\right) - 1} = 3.15.$$

For the angle of recess ($\Theta$) by formula 4 we have:

$$\cos \alpha = \frac{\cos P}{1 + \frac{1}{r}} = \frac{0.9032}{1 + \frac{1}{3.15}} = 0.6482 \text{ or } 46° 50'.$$

$$\Theta = \alpha - P = 46° 50' - 25° 25' = 21° 25'.$$

Having the desired angles of action we now proceed to find corresponding tooth parts by means of formulæ 3 and 6, or 7, as the case may be. The angle of approach is a function of the gear addendum and the angle of recess a function of the pinion addendum.

GEAR ADDENDUM.

If the calculated angle of approach exceeds the obliquity it must be restricted to the obliquity and formula 6 may be employed in finding the gear addendum. In our example, however, the approach is less than the obliquity and formula 7 is used, we have:

$$d = 0.7571$$
$$\text{Sine}^2 P = 0.4292^2 = 0.1842$$

and $$A_g = \sec^2 E_p d \text{ sine}^2 P \frac{P_a}{P} = 1.0203 \times 0.7571 \times 0.1842 \times \frac{73}{75.42} = 0.1226''.$$

The second part of formula 7 (that is, $\sec E_p d \text{ sine}^2 P 0.05$) is not used in this example as it makes no material change in gear addendum for this particularly gear ratio. As miter gears are approached, however, it must be employed.

Pinion addendum.

The pinion addendum is found by formula 3 as follows:

$$A_p = \frac{D \sec E_p}{r} = \frac{0.7571 \times 1.01}{3.15} = 0.2427''$$

Having settled upon the angle of approach and of recess and determined therefrom the gear and pinion addenda, we next determine the proper number of teeth in contact by formula 8 and derive the number of teeth in pinion by means of formulæ 9 or 10, as the case may be.

Number of teeth in contact.

The desired number of teeth in contact is, according to formula 8, as follows: ($\triangle = 40° 0'$); $N_c = 1.4 \cos \triangle = 1.4 \times 0.766 = 1.07$.

It is recommended in this connection that the value of $N_c$ be held above 1.0. This means that, based upon our maximum recommendations (1.6 cos $\triangle$) an angle of 48° 0' must not be exceeded.

Number of teeth in pinion.

The application of formulæ 9 or 10 will usually result in a fractional value. The nearest integral number is taken as the number of teeth in pinion and a check is then made by means of a second part of formula 9 or by formula 10 in order to see that the limits set for $N_c$ by formula 8 are not exceeded.

Since the angle of approach is in this example less than the angle of obliquity, formula 9 must be employed to determine the number of teeth in the pinion. This necessitates finding the "side angle" B by formula 12.

Figure 3:
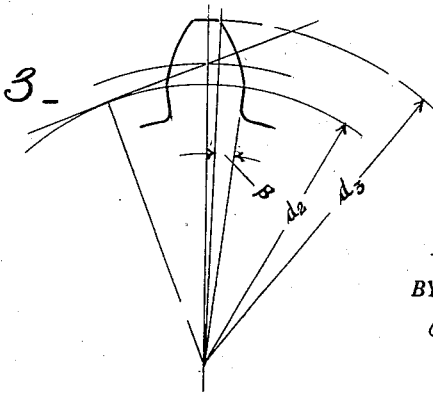
Figure 3 is a diagrammatic view illustrating the side angle.

Referring to Fig. 3 it will be found that the side angle in our example, according to $r$, is 14° 10'. We have, therefore:

$P_a = 23° 0'$
$\Theta = 21° 25'$
$B = 14° 10'$
$N_c = 1.07$
$\cos E_p = 0.9899$ and $$(9) \quad n = \frac{360 N_c \cos E_p}{P_a + \Theta + B} = \frac{360 \times 1.07 \times 0.9899}{23° + 21° 25' + 14° 10'} = \frac{381.3}{58.6} = 6.5$$

We can use either 6 or 7 teeth in this case, but the number of teeth in contact must be checked to be sure that it does not then fall outside the recommended limits: that is, from 1.40 to 1.60 times the cosine of spiral angle, also that it does not, in any case, fall below 1.0.

According to the second part of formula 9 we have:

$$N_c = \frac{P_a + \theta + B}{\left(\frac{360.}{n \sec E_p}\right)} = \frac{58.6}{59.5} = 0.9850.$$

This comes within the minimum limits of formula 8 ($1.25 \times 0.766 = 0.977$) but falls below the general minimum set (1.0). Still in case a full length can be assured it would be a proper value. To raise $N_c$ as desired it will be necessary to increase the spiral angle from 40° to about 42° or increase the cutter obliquity. Suppose, however, that a full bearing is assured and that we proceed upon the original assumption as to normal or cutter obliquity and spiral angle, employing 6 teeth in pinion.

Teeth in gear and pinion.

The number of teeth in the gear is, of course, the number of teeth in pinion times the ratio of reduction—$N = nR = 6 \times 7 = 42$. It is recommended that even ratios, such as this be avoided, so that instead of a 6/42 ratio, a 6/41 or 6/43 ratio could be used.

Total number of teeth in contact.

It is recommended that the total number of teeth in contact ($N_t$), found by formula 19, is not allowed to fall below 2.0. In order to check this, the axial circular pitch ($C_a$) must be first found.

For this we require the pitch cone distance ($e$), the face ($f$), which is assumed to be $1\frac{1}{4}''$, and the average circular pitch ($c_t$). Usual recommendation for maximum width of face is one quarter the pitch cone distance ($e$).

$$e = \frac{d}{\sin E_p} = \frac{0.7571}{0.1415} = 5.3570''$$

$$\max. f = \frac{e}{4} = \frac{5.357}{4} = 1.339, 1\tfrac{1}{4}'' \text{ however is used.}$$

(15) $\quad c = \dfrac{6.2832 d}{n} = \dfrac{6.2832 \times 0.7571}{6} = 0.7941$

(17) $\quad c_t = c \dfrac{e - f_s}{e} = 0.7941 \times \dfrac{5.357 - \tfrac{1.25}{2}}{5.357} = 0.700''$

(18) $\quad C_a = c_t \cot \Delta = 0.7 \times 1.2 = 0.840''$ axial pitch

(19) $\quad N_t = \left(1 + \dfrac{f}{C_a}\right) N_c = \left(1 + \dfrac{1.25}{0.84}\right) \times 0.985 = 2.45$ 2.45 teeth in total contact will be satisfactory (3.0 recommended).

Operating clearances.

(21) bottom clearance $= 0.0142 \sqrt{e} = 0.0142 \times \sqrt{5.357} = 0.0330''$

(22) side clearance $= 0.0035 \sqrt{e} = 0.0035 \times \sqrt{5.357} = 0.0082$

Tooth thickness.

(23) thickness of gear tooth, $t_g = \dfrac{c}{1 + \sqrt{\dfrac{a_p}{A_g}}} = \dfrac{0.794}{1 + \sqrt{\dfrac{0.2438}{0.1226}}} = 0.2380''$

(24) thickness of pin. tooth, $t_p = 0.794 - 0.238 = 5560''$

Our final dimensions are:

| Dimensions. | Gear. | Pinion. |
|---|---|---|
| No. teeth | 42 | 6 |
| Pitch dia | 10.6 | 1.5142'' |
| Addendum | 0.1226'' | 0.2426'' |
| Dedendum | 0.2760 | 0.1560 |
| Whole depth | 0.3986 | 0.3986 |
| Thickness at p. line | 0.2380'' | 0.5560'' |
| Pitch | 3.962 | |
| Face | $1\tfrac{1}{4}''$ | |

Dimensions gear and pinion.

Normal obliquity _____ 20° 0'
Virtual obliquity _____ 25° 25'
Spiral angle _____ 40° 0'

What I claim is:

1. The art or method of determining the tooth parts of intermeshing gears consisting in generating the teeth of the gear in accordance with the following formula.

$$d \sec E \sin^2 p \frac{P_a}{p} = \text{gear addendum}$$

and in generating the teeth of the pinion in accordance with the following formula $$\frac{d\left(\frac{\cos p}{\cos(p+\Omega)} - 1\right)}{\sec^2 E} = \text{pinion addendum}$$

in both of which formulas

Tan $p$ = tan of normal obliquity × secant spiral angle

Cot $E = \sqrt{\text{ratio of reduction}}$ for spur gears

Cot $E$ = ratio of reduction for bevel gears $$\text{Sine } P_a = \frac{\tan p}{\sec \Omega}.$$

$d$ = pitch radius of spur or virtual radius of bevel pinion.
$P_a$ cannot exceed value of P.
$\Omega$ = assumed within known limits.

2. A pair of intermeshing gears having generated gear teeth in which the tooth parts of the gear are based upon the formula as follows:

$$d \sec E \sin^2 p = \frac{P_a}{p} = \text{gear addendum}$$

and the tooth parts of the pinion on the following $$\frac{d\left(\frac{\cos p}{\cos(p+\Omega)} - 1\right)}{\sec^2 E} = \text{pinion addendum}$$

in both of which formulas

Tan $p$ = tan of normal obliquity × secant spiral angle

Cot $E = \sqrt{\text{ratio of reduction}}$ for spur gears

Cot $E$ = ratio of reduction for bevel gears $$\text{Sine } P_a = \frac{\tan p}{\sec \Omega}$$

$d$ = pitch radius of spur or virtual radius of bevel pinion
$P_a$ cannot exceed value of $p$
$\Omega$ = assumed within limits.

In testimony whereof, I have hereunto signed my name at Syracuse, in the county of Onondaga, and State of New York, this 27th day of September, 1919.

CHARLES H. LOGUE.